United States Patent [19]

Gerulis

[11] 4,192,338

[45] Mar. 11, 1980

[54] HYDRAULIC LOCK-OUT DEVICE

[76] Inventor: Benedict R. Gerulis, 3420 48th Ave. North, Minneapolis, Minn. 55429

[21] Appl. No.: 906,008

[22] Filed: May 15, 1978

[51] Int. Cl.[2] ........................ F15B 13/042; G05D 7/00

[52] U.S. Cl. ........................................ 137/106; 91/420; 137/513.5

[58] Field of Search ............... 91/420; 137/513.5, 102, 137/106

[56] References Cited

U.S. PATENT DOCUMENTS

| | | | |
|---|---|---|---|
| 851,999 | 4/1907 | Skellenger | 137/513.5 X |
| 2,588,520 | 3/1952 | Halgren et al. | 91/420 |
| 2,672,888 | 3/1954 | Shields | 137/513.5 X |
| 3,814,413 | 6/1974 | Bopp | 91/420 X |
| 4,103,699 | 8/1978 | Vik | 91/420 |

*Primary Examiner*—Irwin C. Cohen

[57] ABSTRACT

A hydraulic lock-out device for use with a hydraulic motor or jack that permits smooth operation of the piston and ram of the hydraulic motor during the working stroke and return stroke without surging or interruptions, and is operative to isolate the hydraulic motor from the fluid system when the ram is still and under load. A check valve associated with a first chamber of the device is operable to admit fluid under pressure to a first end of the hydraulic cylinder to move the piston from the first end toward the second end of the cylinder during a working stroke. A second valve associated with a second chamber of the device admits fluid to the second end of the cylinder for the return stroke of the piston and ram. Introduction of hydraulic fluid under pressure into the second chamber of the device is operable to move an actuating plunger and stem in the first chamber to open the first check valve to permit flow of hydraulic fluid from the first end of the hydraulic cylinder during the return stroke of the hydraulic piston. The permissible rate of flow of hydraulic fluid from the second valve to the second end of the hydraulic cylinder is not substantially influenced by the position of the first valve such that surging and pulsations are eliminated during the return stroke of the hydraulic piston in the hydraulic cylinder. When the hydraulic ram is still and under load, the first check valve is closed to isolate or lock-out the hydraulic motor from the fluid system.

3 Claims, 6 Drawing Figures

FIG. 3
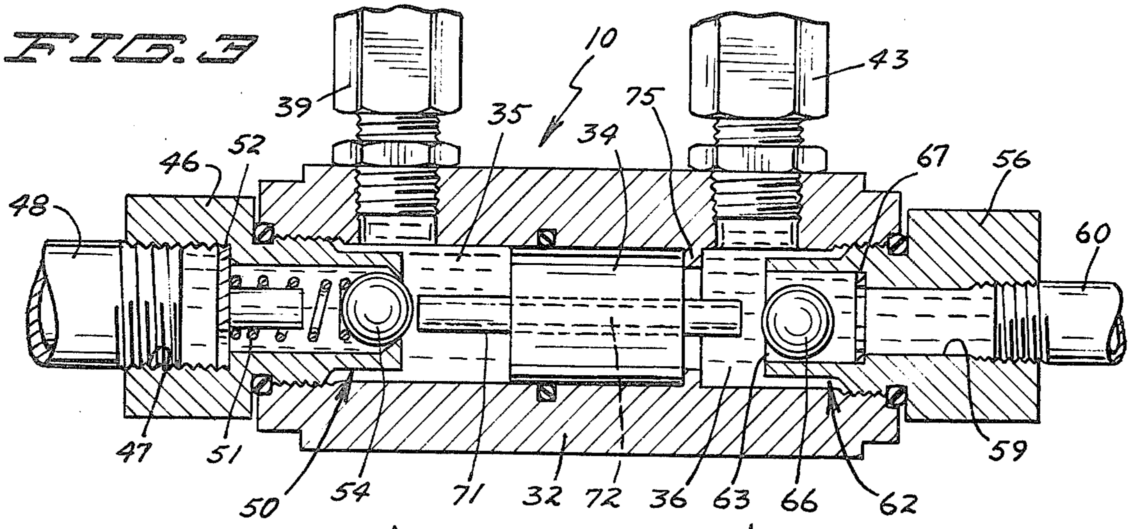
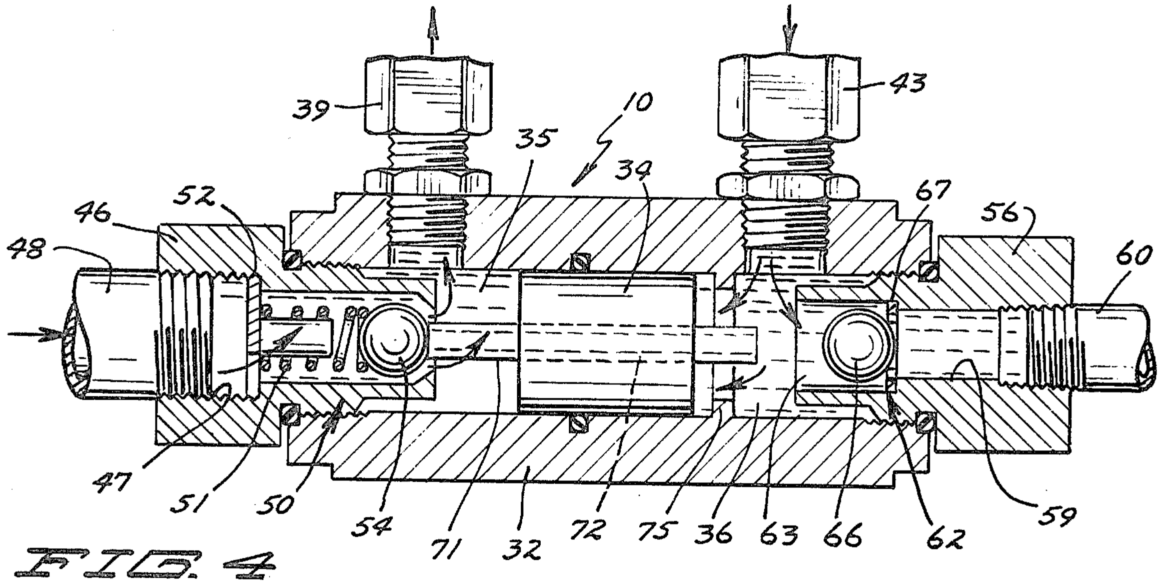
FIG. 4
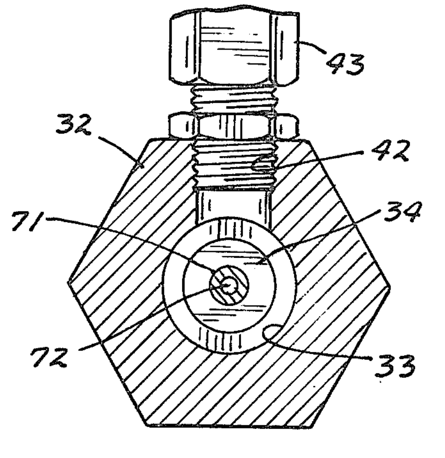
FIG. 5
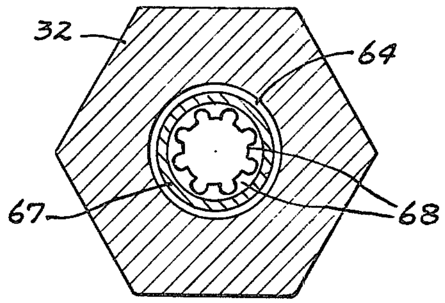
FIG. 6

HYDRAULIC LOCK-OUT DEVICE

BACKGROUND OF THE INVENTION

Conventional hydraulic motors or jacks include a piston located in a hydraulic cylinder with a ram extended from the cylinder, and a manually operable control valve to admit hydraulic fluid under pressure to the pressure end of the cylinder during the working stroke of the piston. The manual control valve also operates to admit hydraulic fluid to the opposite end of the cylinder during the return stroke of the piston while providing for release of hydraulic fluid from the pressure end of the hydraulic cylinder. A lock-out device or valve is commonly interposed between the hydraulic motor and the control valve to isolate the motor from the control valve and the remainder of the system when the hydraulic motor is at rest and under load. This is done to prevent leakage and to remove stress from the control system which could otherwise result in system failure. Such devices usually include two separate check valves, one associated with the high pressure end of the hydraulic cylinder and the other associated with the lower pressure end of the cylinder. When fluid is introduced into one end of the cylinder, the fluid pressure is operative to open the valve asociated with that end of the cylinder, but it is necessary to provide means to open the other valve to permit release of fluid from the other end of the cylinder. This usually takes the form of a mechanism that assures that when one valve opens, the other also opens in proportionate degree. See, for example, U.S. Pat. No. 2,588,520 to Halgren. Commonly, this mechanism includes an actuator plunger which is moved by hydraulic fluid under pressure passing through one valve to a position where it mechanically opens or unseats the other valve to permit displaced fluid to pass through the other valve as fluid under pressure enters the first valve. This interrelationship of the check valves gives rise to pulsations or interruptions in the movement of the ram of the hydraulic cylinder. For example, upon the return stroke of the piston when a load is carried by the ram, hydraulic fluid is admitted to the low pressure side of the hydraulic cylinder while it is released from the high pressure side. Hydraulic fluid under pressure is effective to unseat the check valve associated with the low pressure side of the cylinder to permit entry of fluid. The actuating plunger is mechanically moved to a position where it unseats the check valve associated with the high pressure side of the cylinder to permit displacement of fluid from that side of the cylinder. As the hydraulic piston moves in the cylinder the pressure drops on the low pressure side of the cylinder causing the check valve associated with that side of the cylinder to move toward a closed position. This mechanically causes the check valve associated with the other end of the cylinder to move toward a closed position also. This causes an interruption of movement of the piston and ram temporarily until hydraulic fluid pressure builds up sufficiently to cause the check valve associated with the low pressure side of the cylinder to move towards the more open position which again moves the other check valve toward a more open position. The resulting pressure differential on the actuating plunger of the device accounts for pulsations or interruptions experienced during movement of the hydraulic ram and piston. The resulting chattering can cause structural damage.

SUMMARY OF THE INVENTION

The invention pertains to a lock-out device for use with a hydraulic motor of the type having a hydraulic cylinder with a piston reciprocally movable in the cylinder and a ram or piston rod connected to the piston and extending from the cylinder. The piston is movable from a first end of the cylinder toward a second end during a working stroke and from the second end toward the first end upon a return stroke. The device includes a housing having an axial opening with an actuating plunger located therein to divide the opening into first and second chambers. The first chamber is connected for fluid communication to the first end of the hydraulic cylinder and includes a check valve orientated to be opened and permit flow of hydraulic fluid under pressure from the first chamber to the first end of the cylinder and to close to prohibit fluid flow from the first end of the cylinder back through the first chamber. The second chamber is connected for fluid communication to the second end of the cylinder and includes a second valve movable between positions allowing free fluid flow from the second end of the cylinder through the second chamber to a reservoir, and a position allowing restricted flow of fluid from the second chamber to the second end of the cylinder. The actuator plunger is movable between the first and second chambers and includes an actuating stem which is operable to open the check valve in the first chamber when the actuating plunger is moved in a direction toward the first chamber. During the working stroke of the piston, hydraulic fluid enters the fluid chamber and then passes through the first check valve into the first end of the cylinder to force movement of the piston. During this stroke fluid passes through the means connecting the second end of the cylinder to the second chamber, past the second valve and back to the reservoir. When the manually operated control valve associated with the system is set to neutral, and when the rod is under load, the first check valve prevents fluid leakage from the cylinder, and the rod is held in place. Fluid communication through the actuating stem equalizes the pressure in the first and second chambers to the lower pressure of the second chamber. Upon the return stroke, hydraulic fluid is introduced through the second chamber past the second valve under the more restricted flow conditions and into the second end of the cylinder. The opening provided by the second valve to permit return flow is independent of the position of the check valve. The pressure in the second cylinder is effective to move the acutating plunger toward the first chamber to a position when the actuating stem opens the check valve and permits flow of hydraulic fluid from the first end of the cylinder through the means connecting the first end of the cylinder to the first chamber, through the first chamber and back to the reservoir. A pressure drop in the second end of the cylinder during the return stroke does not effect the opening provided by the second valve and the flow of hydraulic fluid through the second chamber is uninterrupted and continuous, eliminating pulsations, interruptions and surging.

IN THE DRAWINGS

FIG. 3 is a sectional view of the hydraulic lock-out device like that of FIG. 2 expect showing the device in a neutral mode;

FIG. 4 is a sectional view of the hydraulic lock-out device like that of FIG. 2 but showing the device in mode for a return stroke of the piston of the hydraulic cylinder;

FIG. 5 is an enlarged sectional view of the hydraulic lock-out device of FIG. 2 taken along the line 5—5 thereof; and FIG. 6 is an enlarged sectional view of the hydraulic lock-out device of FIG. 2 taken along the line 6—6 thereof.

DESCRIPTION OF A PREFERRED EMBODIMENT

Figure 1:
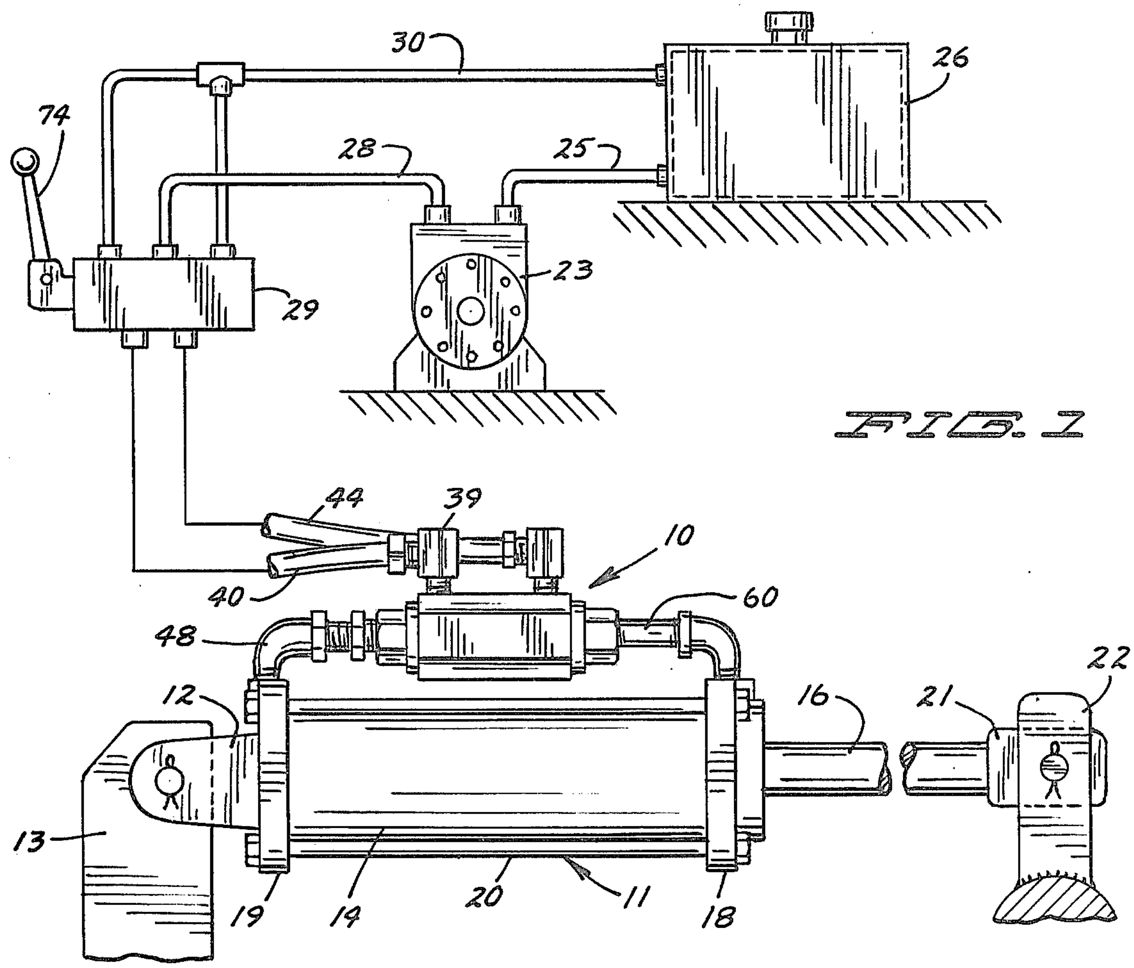
FIG. 1 is a side elevational view of the lock-out device according to the present invention installed on a hydraulic motor of the reciprocating rod and piston variety.

Referring to the drawings, there is shown in FIG. 1 a lock-out device indicated generally at 10 according to the present invention installed on a hydraulic motor 11 of the reciprocating rod and piston variety. Hydraulic motor 11 has a bracket 12 at one end which assembles it to a support 13. Hydraulic motor 11 includes the usual hydraulic cylinder 14 having a piston 15 reciprocally movable therein and assembled to a rod or ram 16 which extends out of an opening in one end cap of the cylinder. The cylinder 14 is closed by the usual end caps 18,19 which are held securely thereon by tie rods 20 fastened at either end by suitable bolts. The outer end 21 of rod 16 is assembled to a work implement 22 for reciprocation thereof in performance of a work function. Hydraulic motor 11 can be installed for any numerous applications for which hydraulic motors are used, for example, for raising and lowering a farm implement attached to a tractor. Hydraulic motor 11 is the type wherein work is performed by the rod 16 upon movement of the piston 15 from one end of the cylinder to the other, following which there is a return stroke when the piston moves back to the first end of the cylinder. The working stroke may occur either when the rod is extended or when it is retracted. For purposes of the present application, it is assumed that the working stroke occurs when the rod is extended or when the piston 15 moves from the left to the right side of the cylinder 14 as viewed in FIG. 1.

The usual control system is provided and includes a hydraulic fluid pump 23 connected by a line 25 to a hydraulic fluid reservoir 26. Output line 28 from pump 23 leads to a manually operable control valve 29 as will be more fully described. Return lines 30 extend from control valve 29 back to the reservoir 26.

Figure 2:
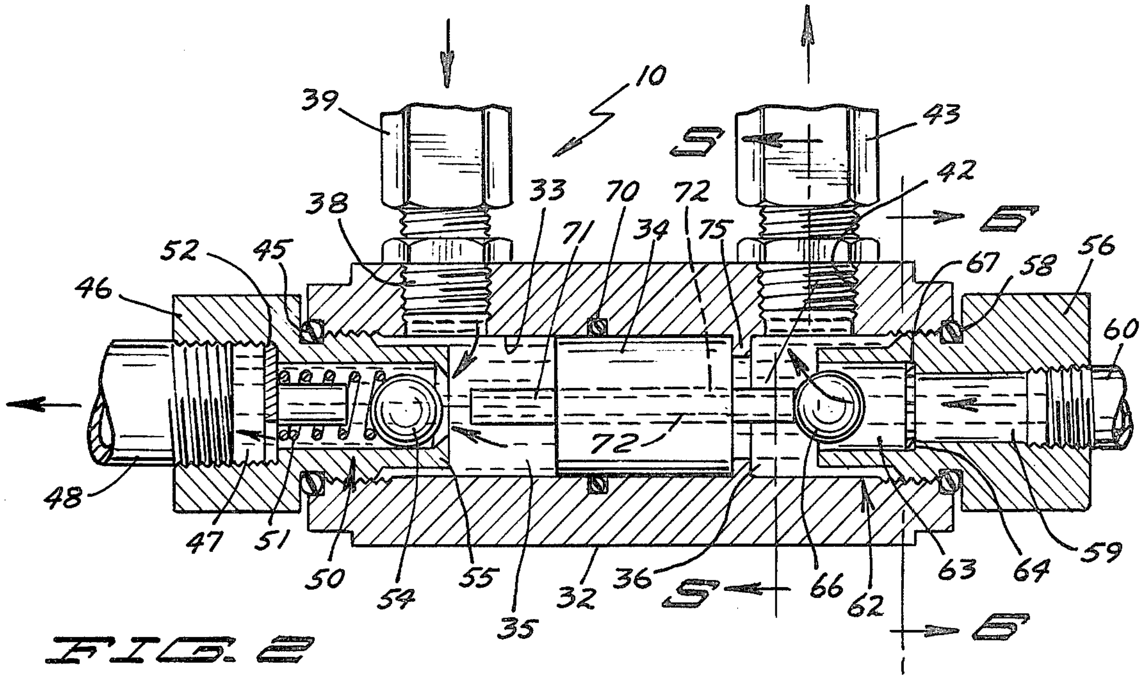
FIG. 2 is an enlarged sectional view of the hydraulic lock-out device of FIG. 1 showing the device in operable mode during a working stroke of the piston of the hydraulic motor.

As shown in FIGS. 2 through 4, lock-out device 10 includes a housing 32 having a longitudinal axial bore 33 which is separated by a reciprocating actuator plunger 34 into a first chamber 35 and a second chamber 36. A first fluid port 38 opens through the wall of housing 32 into the first chamber 35. Threadably assembled in port 38 is a connector 39 connected to a fluid line or hose 40 (see FIG. 1) for communication between control valve 29 and first chamber 35. In like manner, a second port 42 is open through the wall of housing 32 to the second chamber 36 and has a second connector 43 threadably assembled therein and connected to a fluid line or hose 44 for fluid communication between the control valve 29 and the second chamber 36.

A first end plug 46 is threaded into the end of axial bore 33 in closing relationship to chamber 35 and sealed by a suitable O-ring 45. Plug 46 has an axial passage 47 for passage of hydraulic fluid. The outer end of passage 47 is enlarged and threaded for receipt of one end of a fluid conduit 48. The other end of fluid conduit 48 opens to a first end of cylinder 14. The inner end of passage 47 of plug 46 is reduced in diameter and contains a check valve assembly 50 shown as a ball and cage variety. Other types of check valves could be used. Bias means comprised as a coil spring 51 bears at one end against a support member 52 which spans passage 47 and can be engaged in the threads therein. A valving ball element or ball 54 engages the other end of spring 51. An annular lip 55 on plug 46 disposed around the inner opening of passage 47 and extending inward relative to the passage 47 provides a valve seat for the ball 54. Check valve 50 is orientated to permit hydraulic fluid under pressure to pass from first chamber 35 through the fluid conduit 48 into the first or working stroke end of cylinder 14. Check valve 50 closes to prohibit fluid under pressure from leaving the first end of cylinder 14 unless it is mechanically opened as will be described.

A second end plug 56 is threaded into the other end of axial bore 33 of housing 32 in closing relationship to second chamber 36 and is sealed by an O-ring 58. Plug 56 has an axial passage 59 threaded at its outer end for connection to a second fluid conduit 60 which leads to the second or return stroke end of cylinder 14. Plug 56 contains a second valve 62 movable between relatively open and relatively closed positions. In the open position, second valve 62 permits free fluid flow from second fluid conduit 60 to second chamber 36. Means are provided for fluid passage from second chamber 36 through second fluid conduit 60 to the second end of cylinder 14 when second valve is in the closed position. The inner end of plug 56 defines an enlarged inner portion or pocket 63 of passage 59 that is separated from the narrower diameter outer end by a shoulder 64. Second valve 62 includes a second valving element or valve ball 66 located in the pocket 63. A washer type ring 67 is abutted against the shoulder 64 to provide a stop for the ball 66. As best shown in FIG. 6, ring 67 has an inner opening defined by a serrated or scalloped edge comprised of a plurality of circumferentially spaced projections or legs projected radially inward to serve as a support or stop for ball 66 whereby valve 62 is never fully closed. Valve 62 is movable between positions with ball 66 moved away from ring 67 wherein full, unimpeded flow is allowed in a position with ball 66 seated against the ring 67 whereby the flow is restricted but permitted. Hydraulic fluid flows through the openings between the teeth 68 of ring 67 when the ball 66 is seated therein.

Actuator plunger 34 is movable in axial bore 33 between positions toward either the first or second chambers responsive to hydraulic pressure in the other chamber. An O-ring 70 located in a suitable circumferential groove in the sidewall of housing 32 defining axial bore 33 is effective to block fluid communication past the actuator plunger 34 between the chambers. An elongate actuator stem 71 is centrally assembled in plunger 34 in alignment with the axis of axial bore 33. Stem 71 extends from either end face of plunger 34 toward the first and second chambers in central alignment with the fluid passages of the respective end plugs 46,56. Actuator stem 71 has a central fluid passage 72 indicated in phantom in FIG. 2 and shown in FIG. 5. Fluid passage 72 permits limited fluid communication between the first and second chambers.

In use of lock-out device 10, a control lever 74 of manual control valve 29 is operated to introduce hydraulic fluid under pressure through the fluid line 40 and through the fluid port 38 into the first chamber 35. Control valve 29 can be a spool type valve (not shown) of the type movable between positions to admit fluid under pressure alternatively through the fluid line 40 or through the second fluid line 44, while at the same time moving to position to permit hydraulic fluid to flow through the valve from the other fluid line and back to reservoir 26.

As shown in FIG. 2 during a working stroke of the piston 15 and rod 16, fluid under pressure is introduced into the first chamber 35. The pressurized fluid opens the ball valve 50 so that fluid can flow through the first conduit 48 and into a first or pressure end of cylinder 14. Piston 15 is moved from the first end of cylinder 14 toward the second end. Fluid from the second end of the cylinder 14 is forced through the second conduit 60 into the second chamber 36. Fluid flows freely through the passage 59 of second end plug 56, moving the ball 66 out of the way, and then through the fluid port 42 and line 44 back to hydraulic fluid reservoir. The fluid pressure that is effective to open the check valve 50 is also effective in the first chamber 35 to move the actuator plunger 34 in a direction toward the second chamber 36. A circumferential shoulder 75 disposed along the inside wall of axial bore 33 is effective to limit the amount of permissable movement of the actuator plunger 34 toward the second chamber 36. Ball 66 of second valve 62 is urged into contact with the end of actuator stem 71 and to close the fluid passage 72 so that there is no fluid communication between the first and second chambers during the working stroke of piston 15.

In FIG. 3, lock-out device 10 is illustrated in a neutral position with piston 15 and rod 16 still or immobile but under a load. This condition occurs when the control valve 29 is moved to a position to stop flow under pressure through the first fluid line 40 and not permit flow under pressure through either fluid line. When the flow of hydraulic fluid under pressure to the first chamber 35 is ceased, ball valve 50 immediately closes to prohibit fluid under pressure in the first end of cylinder 14 from flowing through the first conduit 48 into the first chamber 35. Hydraulic fluid under pressure in the first chamber 35 then passes through the passageway 72 of actuator stem 71 into the second chamber 36 and out of the second fluid port 42. The pressure in the first and second chambers is very quickly equalized and the pressure in cylinder 14 is locked in without there being any pressure on the remainder of the fluid system.

Upon the return stroke of piston 15 and rod 16, the lock-out device mode illustrated in FIG. 4, control valve 29 is operated to deliver hydraulic fluid under pressure through the second fluid line 44 and through the second fluid port 42 into the second chamber 36. Fluid under pressure in the second chamber 36 causes the ball 66 to be seated against ring 67. Flow occurs around the ball 66 and through the spaces between the legs 68 of ring 67 although more restricted flow than in the reverse direction. Fluid moves through the conduit 60 into the second end of the cylinder 14 causing the piston 15 to move toward the first end of the cylinder 14 and in the direction of loading upon the rod 16. The hydraulic fluid under pressure in the second chamber 36 causes movement of actuator plunger 34 in a direction toward the first chamber 35 bringing the end of actuator stem 71 in contact with the ball 54 of check valve 50 to move it in a direction to open the valve as shown in FIG. 4. Hydraulic fluid is then permitted to flow from the first end of the cylinder 14 through the fluid conduit 48 into the first chamber 35 of device 10 and out through the first fluid port 38. A drop in pressure behind the piston 15 in the second end of cylinder 14 will have no influence on the flow rate permitted through the second valve 62 so that there is no surging, chattering or interruption in the smooth movement of the piston 15 and rod 16 upon the return stroke. If there is a pressure drop on the first end of cylinder 14 so as to cause movement of the check valve 50 toward a closed position, this will move the actuator stem 71 and actuator plunger 44 in a direction toward the second chamber 36 accompanied by a build-up of pressure in the second chamber 36 due to the decrease in volume thereof. This additional pressure is influential in moving the actuator plunger 34 back toward the first chamber to move the ball 54 of check valve 50 toward a more open position. Flow through the lock-out device 10 is thus modulated and pulsation are eliminated.

Lock-out device 10 can be used in other types of hydraulic circuits. It can be installed quickly and easily on existing hydraulic cylinders.

While there has been shown and described a preferred embodiment of the invention, it will be apparent to those skilled in the art that deviations can be had from the embodiment shown and described without departing from the scope and spirit of the appended claims.

The embodiments of the invention in which an exclusive property or privilege is claimed are defined as follows:

1. A lock-out device for use with a hydraulic motor of the type having a hydraulic cylinder and a piston and rod assembly reciprocally movable in the hydraulic cylinder from a first end of the hydraulic cylinder toward a second end of the hydraulic cylinder during a working stroke, and from the second end of the hydraulic cylinder toward the first end of the hydraulic cylinder during the return stroke, said device including:

- a housing having a first chamber and a second chamber;
- a first fluid port open to the first chamber for ingress and egress of fluid from a fluid supply;
- a first fluid conduit connected to the first chamber;
- a check valve located in the first chamber oriented with respect to the first fluid conduit to permit passage of fluid under pressure from the first chamber through the first conduit and means for maintaining the check valve normally biased in a closed configuration to prohibit movement of fluid through the first fluid conduit back to the first chamber;
- a second fluid port open to the second chamber for ingress and egress of fluid to the second chamber from a fluid supply;
- a second fluid conduit connected to the second chamber;
- a second valve located in the second chamber positioned with respect to the second fluid conduit movable to a first position to permit free flow of fluid through the second fluid conduit into the second chamber and a second position to permit restricted flow of fluid through the second chamber and through the second conduit, said second valve including a valve stop associated with the passageway of the second fluid conduit into the second chamber, a second valve ball located in the second chamber movable to a position away from the valve stop to permit free fluid flow, and movable into position of seated relationship with the valve stop, said second valve stop shaped to permit restricted fluid flow past the second ball from the second chamber to the second fluid conduit when the second valve ball is seated therein; and means responsive to pressure in the second chamber operable to open the check valve in the first chamber when fluid pressure is applied through the second port, through the second chamber, and through the second conduit to the second end of the cylinder, said means to open the check valve including an actuator plunger disposed in the housing between the first and second chambers movable in one direction toward the first chamber responsive to fluid pressure in the second chamber, and movable in the opposite direction toward the second chamber responsive to fluid pressure in the first chamber, and means on said actuator plunger to contact the check valve to open the check valve as the actuator plunger is moved toward the first chamber; and the means on the actuator plunger to contact the check valve including an actuator stem having one end extending toward the first chamber and another end extending toward the second chamber, the end extending toward the first chamber adapted to contact said check valve to open the check valve upon movement of the actuator plunger toward the first chamber responsive to pressure in the second chamber, said end of the actuator stem extending toward the second chamber adapted to contact the second valve ball in the second chamber when the actuator plunger moves toward the second chamber responsive to fluid pressure in the first chamber and responsive to fluid flow through the first fluid port, through the first chamber, and through the first conduit and responsive to fluid flow through the second fluid conduit into the second chamber and out of the second port, said actuator stem having a fluid passage for fluid communication between the first and second chambers, said fluid passage being closed on contact with the stem and the check valve and being closed upon contact between the stem and the second valve ball, and means in the second chamber limiting the amount of movement of the actuator plunger toward the second chamber.

2. The lock-out device of claim 1 wherein:

said valve stop includes a washer like ring having a central opening defined by an annular serrated edge.

3. The lock-out device of claim 1 wherein:

said means limiting the amount of movement of the actuator plunger in the second chamber includes a shoulder in the second chamber positioned to intercept the plunger as it moves toward the second chamber and prohibits further movement into the second chamber.

* * * * *